(12) United States Patent
Leeser et al.

(10) Patent No.: US 12,000,736 B2
(45) Date of Patent: Jun. 4, 2024

(54) MAINTENANCE SYSTEM AND METHOD FOR MAINTAINING A GATE DEVICE

(71) Applicant: FRABA B.V., SG Heerlen (NL)

(72) Inventors: Christian Leeser, Duesseldorf (DE);
Martin Forthaus, Cologne (DE);
Konrad Machill, Cologne (DE)

(73) Assignee: FRABA B.V., SG Heerlen (NL)

( * ) Notice: Subject to any disclaimer, the term of this patent is extended or adjusted under 35 U.S.C. 154(b) by 717 days.

(21) Appl. No.: 17/258,448

(22) PCT Filed: Jul. 10, 2018

(86) PCT No.: PCT/EP2018/068650
§ 371 (c)(1),
(2) Date: Jan. 7, 2021

(87) PCT Pub. No.: WO2020/011341
PCT Pub. Date: Jan. 16, 2020

(65) Prior Publication Data
US 2021/0293631 A1 Sep. 23, 2021

(51) Int. Cl.
| G01K 13/08 | (2006.01) |
| E05F 15/603 | (2015.01) |
| G01K 1/02 | (2021.01) |

(52) U.S. Cl.
CPC ............ *G01K 13/08* (2013.01); *E05F 15/603* (2015.01); *G01K 1/026* (2013.01); *E05Y 2201/434* (2013.01); *E05Y 2400/44* (2013.01); *E05Y 2400/502* (2013.01); *E05Y 2900/40* (2013.01)

(58) Field of Classification Search
CPC ............................ G01K 1/026; E05Y 2900/40
See application file for complete search history.

(56) References Cited

U.S. PATENT DOCUMENTS

| 5,351,439 A | 10/1994 | Takeda et al. | |
| 5,929,580 A * | 7/1999 | Mullet | E05F 15/41 |
| | | | 160/292 |

(Continued)

FOREIGN PATENT DOCUMENTS

| DE | 10 2010 050 827 A1 | 4/2012 |
| DE | 10 2014 103 456 A1 | 9/2015 |

(Continued)

*Primary Examiner* — Lisa M Caputo
*Assistant Examiner* — Cynthia L Davis
(74) *Attorney, Agent, or Firm* — Norman B. Thot

(57) ABSTRACT

A maintenance system for a gate device includes a controller, at least one temperature sensor, and an evaluation unit. The controller has a motor control unit which actuates a drive apparatus for driving a gate member, and a non-volatile memory which stores gate data. The gate data is retrievable from the non-volatile memory. The at least one temperature sensor is arranged in a region of the drive apparatus. The at least one temperature sensor continuously transmits a detected temperature as further gate data to the non-volatile memory of the controller. The evaluation unit creates a temperature curve for each of the at least one temperature sensor over a preset operating cycle. A comparison of more than one temperature curve allows a conclusion to be drawn of a need for maintenance of the gate device.

12 Claims, 3 Drawing Sheets

(56) References Cited

U.S. PATENT DOCUMENTS

| | | | | |
|---|---|---|---|---|
| 2010/0019135 A1* | 1/2010 | Eckert | ................... | H02K 11/22 250/231.13 |
| 2011/0116075 A1* | 5/2011 | Guichard | ........... | G01D 5/35303 356/32 |
| 2012/0112580 A1* | 5/2012 | Sato | ....................... | H02K 11/25 310/71 |
| 2016/0245009 A1* | 8/2016 | Quaiser | .................. | G08C 17/02 |
| 2017/0247933 A1* | 8/2017 | Elie | ....................... | G01K 3/005 |
| 2018/0119476 A1 | 5/2018 | Quaiser | | |
| 2018/0309347 A1* | 10/2018 | Kusserow | ............. | B66B 11/043 |

FOREIGN PATENT DOCUMENTS

| | | |
|---|---|---|
| DE | 10 2015 102 405 A1 | 8/2016 |
| DE | 10 2015 102 797 A1 | 9/2016 |
| EP | 0 935 834 B1 | 8/1999 |
| JP | 2011-184966 A | 9/2011 |
| WO | WO 2016/180556 A1 | 11/2016 |

\* cited by examiner

MAINTENANCE SYSTEM AND METHOD FOR MAINTAINING A GATE DEVICE

CROSS REFERENCE TO PRIOR APPLICATIONS

This application is a U.S. National Phase application under 35 U.S.C. § 371 of International Application No. PCT/EP2018/068650, filed on Jul. 10, 2018. The International Application was published in German on Jan. 16, 2020 as WO 2020/011341 A1 under PCT Article 21(2).

FIELD

The present invention relates to a maintenance system for a gate device, wherein a controller is provided which comprises a motor control unit for actuating a drive apparatus for driving a gate member and a non-volatile memory for storing gate data, the gate data being retrievable from the non-volatile memory.

BACKGROUND

Such a maintenance system has previously been described in DE 10 2015 102 405.5. It is thus possible to easily maintain a gate device, wherein access to the gate data or the maintenance data, respectively, does not necessarily need to take place on site. Such a maintenance system is, however, still limited to a "malfunction" in which a part of the gate device or the entire gate device has failed or to a regular maintenance interval at which it is then determined, in the best case, that the gate functions properly. Despite the storage of gate data, it is not possible to perform a so-called diagnosis of the gate device which prevents "failures" or "malfunctions" at an early stage and thus in time.

SUMMARY

An aspect of the present invention is to provide a maintenance system for a gate device which provides a diagnosis of the gate device and thus a kind of early-warning system for possible damage.

In an embodiment, the present invention provides a maintenance system for a gate device which includes a controller, at least one temperature sensor, and an evaluation unit. The controller comprises a motor control unit which is configured to actuate a drive apparatus for driving a gate member, and a non-volatile memory which is configured to store gate data. The gate data is retrievable from the non-volatile memory. The at least one temperature sensor is arranged in a region of the drive apparatus. The at least one temperature sensor is configured to continuously transmit a detected temperature as further gate data to the non-volatile memory of the controller. The evaluation unit is configured to create a temperature curve for each of the at least one temperature sensor over a preset operating cycle. A comparison of more than one temperature curve allows a conclusion to be drawn of a need for maintenance of the gate device.

BRIEF DESCRIPTION OF THE DRAWINGS

The present invention is described in greater detail below on the basis of embodiments and of the drawings in which.

DETAILED DESCRIPTION

Figure 1:
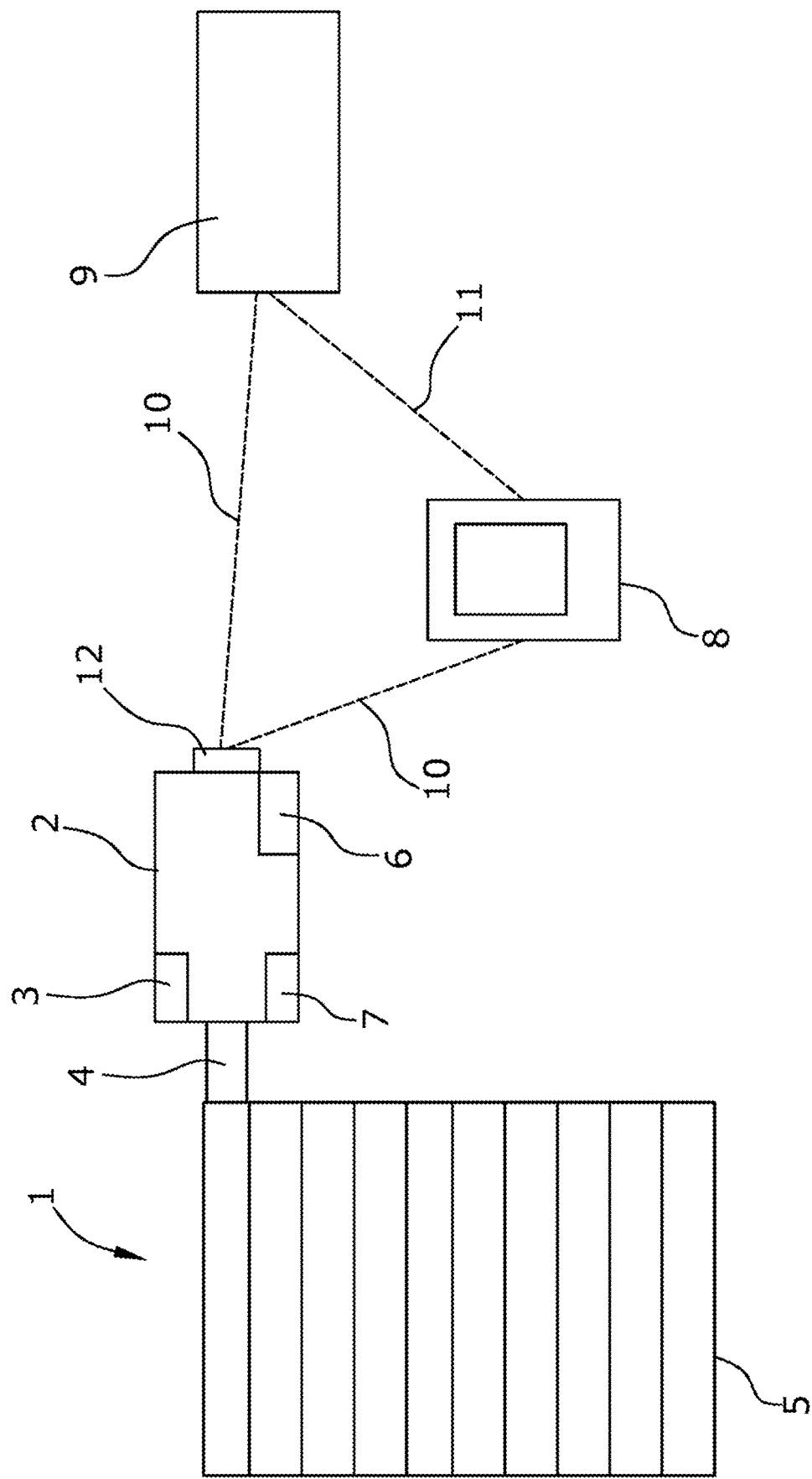
FIG. 1 shows a schematic view of a maintenance system for a gate device according to the prior art.

The maintenance system according to the present invention provides at least one temperature sensor which is situated in the region of the drive apparatus, wherein the temperature sensor continuously transmits detected temperatures $T_n$ as additional gate data to the non-volatile memory of the controller, wherein an evaluation unit is provided which creates a temperature curve $f_n(T_N)$ in each case over preset operating cycles, wherein a comparison of a number of temperature curves $f_n(T_N)$ allows a conclusion to be drawn about a need for maintenance of the gate device. The temperature of the drive apparatus allows for conclusions to be drawn about all movable parts, such as the drive apparatus itself, the transmission, or also the gate leaf as well as the associated bearings. A steadily rising temperature curve over several consecutive operating cycles can in particular be an indication for possible defects in the transmission unit, the gate leaf guidance, or suspension, which can be fixed in an easy and cost-effective manner before resulting in a spontaneous functional failure of the gate device.

The at least one temperature sensor is advantageously provided on a thermally conductive housing part of a housing of the drive apparatus.

A particularly compact system, which is thus also easy to retrofit, is provided by the fact that the evaluation unit is provided in the controller, however, the evaluation unit can also be connected as a retrofit unit to an existing controller.

A plurality of temperature sensors is advantageously provided. A motor housing part, a bearing housing part and/or a transmission housing part can, for example, be provided as housing parts on which temperature sensors are arranged. A defect can thus be localized quicker and easier.

An ambient temperature sensor for detecting the ambient temperature may be provided in order to exclude a seasonal influence on the evaluation of the temperature curves $f_n(T_N)$.

In an embodiment of the present invention, further sensors can, for example, be provided, for example, at least one vibration sensor, at least one microphone and/or at least one electronic nose in the region of the drive apparatus, so that an even more precise diagnosis can be carried out. Particularly when using a microphone, further microphones may be provided which enable a filtering of interfering noise.

The at least one temperature sensor is advantageously mounted to the housing of the drive apparatus via a mechanical bracket. The at least one temperature sensor can alternatively or additionally be arranged on the thermally conductive housing part via a thermally conductive adhesive.

In an embodiment of the present invention, a central maintenance data memory can, for example, be provided, the central maintenance data memory comprising maintenance data for configuring, monitoring and/or modifying at least one controller. The central maintenance data memory can of course be directly connected with the controller. A mobile maintenance device may also be provided which is adapted to be coupled with the non-volatile memory of the controller via a bidirectional first data connection in order to maintain the gate device, wherein the mobile maintenance device is adapted to be coupled directly or indirectly with the central maintenance data memory via a bidirectional second data connection. It is thus possible for an installer to download the current data for maintenance during a maintenance procedure in a particularly quick and easy manner.

Faulty work due to information not being available to the installer can thereby be excluded. "Maintenance data" are further immediately transmitted to a central maintenance data memory of a manufacturing company. Access to gate data or maintenance data, respectively, does not necessarily need to take place on site. The definition of the mobile maintenance device is thereby to be understood so that it does not belong to the central maintenance data memory in terms of control.

The gate data may, for example, include a serial number, a gate position, a gate type, a number of closing cycles, hardware information, a fault message and/or operating states of a gate device.

The motor control unit and the non-volatile memory can advantageously be provided separately. It can thereby be provided that the gate data required for the diagnosis or a maintenance procedure, respectively, are not overwritten.

The present invention is described in greater detail below by means of an embodiment under reference to the accompanying drawings.

FIG. 1 shows a schematic view of an arrangement of a maintenance system for a gate device 1. A controller 2 of gate device 1 comprises a motor control unit 3 for actuating a drive apparatus 4, which causes a lowering or lifting of a gate member 5, a non-volatile memory 6, and an evaluation unit 7. Gate data of gate device 1 are stored in the non-volatile memory 6 which is provided separately from the motor control unit 3. Possible gate data may be a serial number, a gate position, a gate type, a number of closing cycles, hardware information, a fault message and/or operating states of gate device 1.

The gate data stored in the non-volatile memory 6 can be read out directly via a first bidirectional data connection 10 from the central maintenance data memory 9 or also from a mobile maintenance device 8, for example, a laptop, a smartphone or a tablet computer. A radio transmitter/receiver 12 is provided in controller 2 for the first bidirectional data connection 10. A USB port may alternatively also be provided. The normal maintenance cycle could, however, also possibly be designed more efficiently if the gate device 1 communicated data directly to the central maintenance data memory 9. This would allow for immediate measures to be taken to prevent a failure of a gate device 1. Necessary spare parts could also be carried directly by the installer during on-site maintenance activities if the maintenance data are known to the installer before performing the maintenance work. In the following description, reading out via the mobile maintenance device 8 is, however, provided as an example.

The mobile maintenance device 8 is connected with a central maintenance data memory 9 via a second bidirectional data connection 11. The central maintenance data memory 9 is, for example, located on a server of a gate manufacturer and includes a plurality of maintenance data of various gate devices. The second bidirectional data connection 11 is used to forward gate data read out from the non-volatile memory 6 by mobile maintenance device 8 to the central maintenance data memory 9, to modify the gate data by the mobile maintenance device 8, and to store the gate data as maintenance data in the central maintenance data memory 9.

Maintenance data stored in the central maintenance data memory 9 can in the same way be transmitted via the first bidirectional data connection 10 and via the second bidirectional data connection 11 from the central maintenance data memory 9 via the mobile maintenance device 8 to the non-volatile memory 6 and can be stored in the non-volatile memory 6.

The maintenance of a gate device 1 can now proceed as follows:

First, an installer, for example, establishes a bidirectional connection between the mobile maintenance device 8 and the non-volatile memory 6. The gate data stored in the non-volatile memory 6 are then read out. The serial number of the gate device 1 can be used for a unique referencing to maintenance data stored in the central maintenance data memory 9. The current maintenance data are then downloaded to the mobile maintenance device 8 so that hereafter the read-out gate data can be compared to the given maintenance data and the installer can start with the required maintenance work. The comparison of gate data and maintenance data can alternatively also be carried out in the central maintenance data memory. The read-out gate data can also be transmitted to the central maintenance data memory 9 for the purpose of documentation and later evaluation.

It is also conceivable that the mobile maintenance device 8 is coupled indirectly with the central maintenance data memory 9 by the fact that a second data connection exists between controller 2 and the central maintenance data memory 9, wherein the mobile maintenance device 8 is then first coupled via the first bidirectional data connection 10 to controller 2. An indirect connection can of course also be established by the fact that the mobile maintenance device 8 is connected to controller 2 via the second bidirectional data connection 11 and via the above-mentioned second data connection between controller 2 and the central maintenance data memory 9.

Controller 2 is here only schematically illustrated. It can be constructed of several components, which can also be provided independently from each other, for example, sensors, circuit boards, actuators. Reference is also made in this regard to DE 10 2014 103 456 for reasons of understanding.

Figure 2:
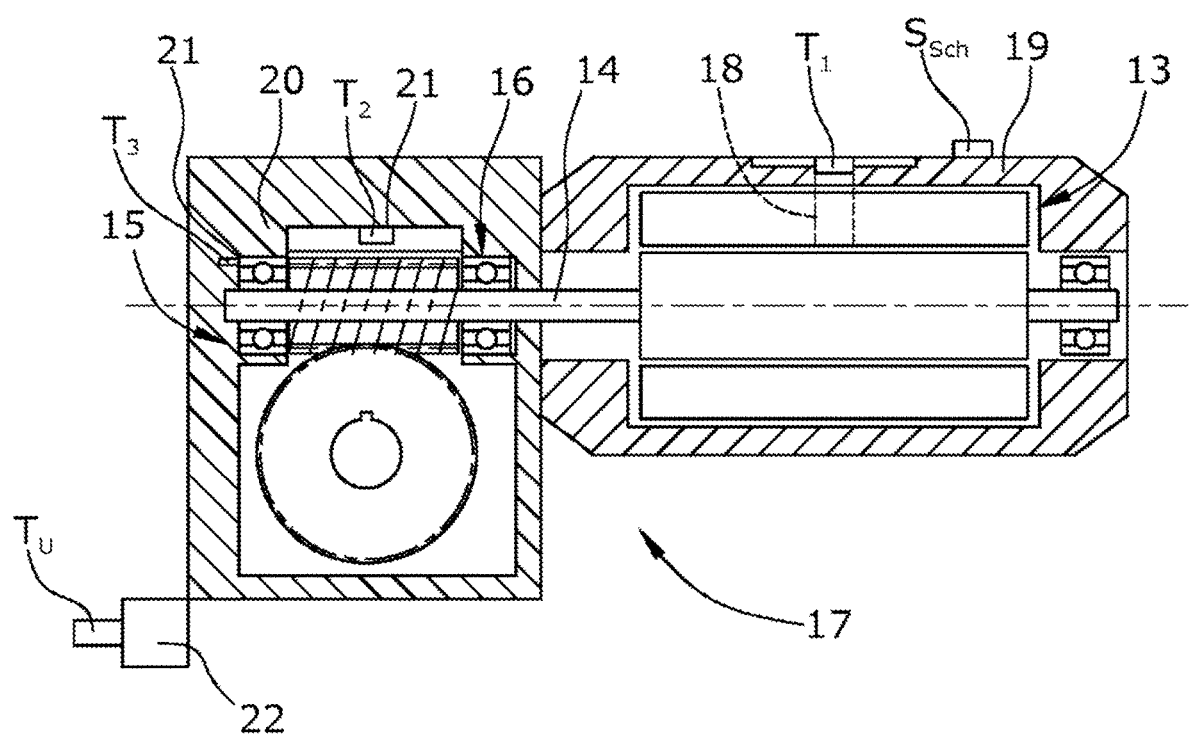
FIG. 2 shows a schematic side view of the drive apparatus of FIG. 1.

FIG. 2 shows a schematic sectional view of drive apparatus 4 of FIG. 1. Drive apparatus 4 consists of an electric motor 13, whose rotary shaft 14 drives a chain wheel (which is not illustrated further) and thus gate member 5 in a known manner via a worm gear 15. Rotary shaft 14 is mounted by a bearing arrangement 16 in a multi-part housing 17 of drive apparatus 4.

In the present exemplary embodiment, four temperature sensors $T_1$, $T_2$, $T_3$ and $T_U$ (for the ambient temperature) as well as one vibration sensor $S_{sch}$ are provided which transmit additional gate data to the non-volatile memory 6. The temperature sensor $T_1$ is arranged on a thermally conductive housing part 19 of electric motor 13 via a mechanical bracket 18. The temperature sensors $T_2$, $T_3$ are provided on a housing part 20 in the region of worm gear 15 and bearing arrangement 16 via a thermally conductive adhesive 21. The temperature sensor $T_U$ for the ambient temperature is mounted to a flange part 22 which is not thermally conductive.

Figure 3:
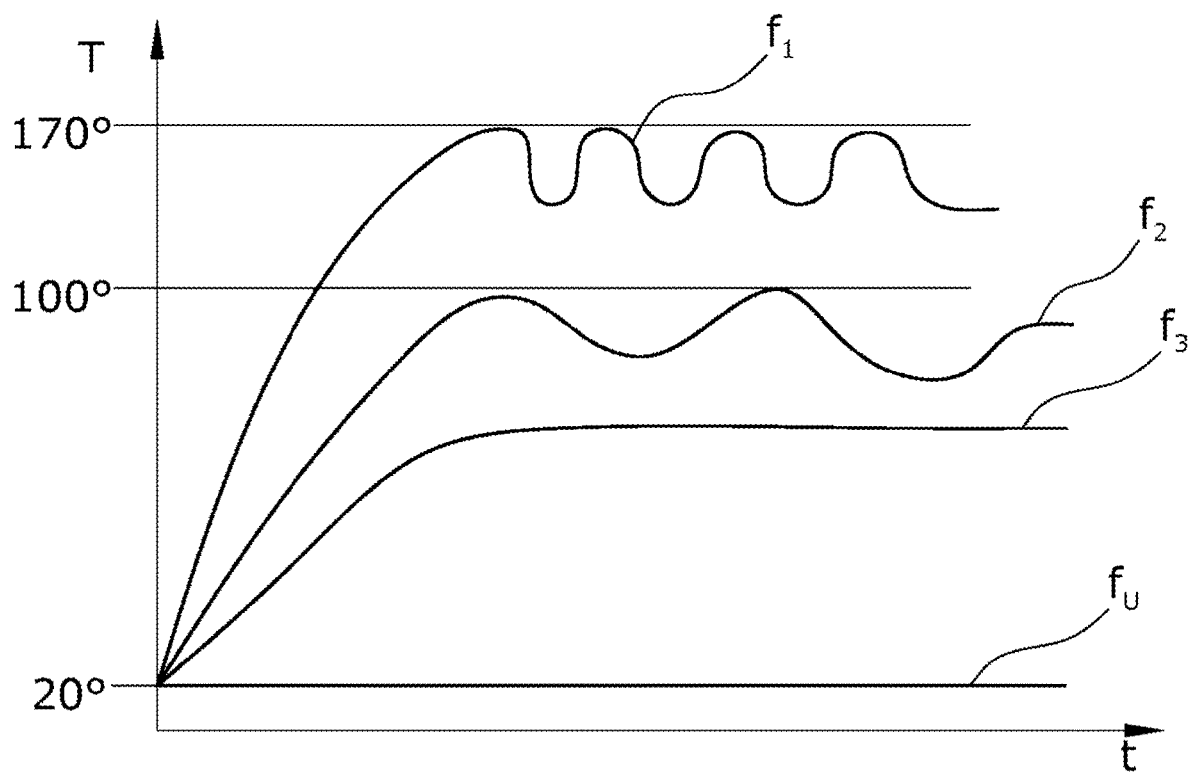
FIG. 3 shows a schematic diagram of different temperature curves.

The temperature sensors $T_1$, $T_2$, $T_3$ and $T_U$ as well as the vibration sensor $S_{sch}$ continuously transmit data to the non-volatile memory 6. In previously specified operating cycles, which of course can be changed at any time, the temperature curves $f_1$, $f_2$, $f_3$ and $f_U$ are determined in evaluation unit 7 depending on the temperatures $T_1$, $T_2$, $T_3$ and $T_U$ (as shown in FIG. 3). The data of the vibration sensor $S_{sch}$ can also be used as a basis for determining curves, which are not, however, here explicitly shown.

A comparison of the individual curves provides information of possible temperature changes due to friction or other malfunctions which are currently not significant but which can ultimately result in a failure of drive apparatus 4.

The present invention is not limited to embodiments described herein; reference should be had to the appended claims.

LIST OF REFERENCE NUMERALS

1 Gate device
2 Controller
3 Motor control unit
4 Drive apparatus
5 Gate member
6 Non-volatile memory
7 Evaluation unit
8 Mobile maintenance device
9 Central maintenance data memory
10 First bidirectional data connection
11 Second bidirectional data connection
12 Radio transmitter/receiver
13 Electric motor
14 Rotary shaft
15 Worm gear
16 Bearing arrangement
17 Multi-part housing
18 Mechanical bracket
19 Thermally conductive housing part
20 Housing part
21 Thermally conductive adhesive
22 Flange part
$f_1$, Temperature curve based on temperature sensor $T_1$
$f_2$ Temperature curve based on temperature sensor $T_2$
$f_3$ Temperature curve based on temperature sensor $T_3$
$f_U$ Temperature curve based on temperature sensor $T_U$
$S_{sch}$ Vibration sensor
t Time
T Temperature
$T_1$ Temperature sensor
$T_2$ Temperature sensor
$T_3$ Temperature sensor
$T_U$ Temperature sensor for the ambient temperature

What is claimed is:

1. A maintenance system for a gate device, the maintenance system comprising:
    a controller which comprises,
        a motor control unit which is configured to actuate a drive apparatus for driving a gate member, and
        a non-volatile memory which is configured to store gate data, the gate data being retrievable from the non-volatile memory;
    an ambient temperature sensor which is arranged in a region of the drive apparatus, the ambient temperature sensor being configured to detect an ambient temperature and to continuously transmit the detected ambient temperature to the non-volatile memory of the controller;
    at least one temperature sensor which is arranged in a region of the drive apparatus, the at least one temperature sensor being configured to continuously transmit a detected temperature as further gate data to the non-volatile memory of the controller; and
    an evaluation unit which is configured to create a temperature curve for the ambient temperature sensor and for each of the at least one temperature sensor over a preset operating cycle,
    wherein,
        a comparison of the temperature curves allows a conclusion to be drawn of a need for maintenance of the gate device, and
        a steadily rising temperature curve of the at least one temperature sensor over several consecutive operating cycles of the gate device, which steadily rising temperature curve excludes a seasonal influence via the ambient temperature sensor, indicates a possible defect in the gate device which is proactively fixable prior to a spontaneous functional failure of the gate device.

2. The maintenance system as recited in claim 1, wherein the evaluation unit is arranged in the controller.

3. The maintenance system as recited in claim 2, wherein the at least one temperature sensor is arranged on a thermally conductive housing part of a housing of the drive apparatus.

4. The maintenance system as recited in claim 3, wherein the at least one temperature sensor is arranged on the thermally conductive housing part of the housing of the drive apparatus via a thermally conductive adhesive.

5. The maintenance system as recited in claim 3, wherein a plurality of the at least one temperature sensor is provided.

6. The maintenance system as recited in claim 5, wherein at least one of a motor housing part, a bearing housing part and a transmission housing part are provided as the thermally conductive housing part on which the plurality of the at least one temperature sensor is arranged.

7. The maintenance system as recited in claim 1, further comprising:
    at least one additional sensor selected from at least one of,
        at least one vibration sensor,
        at least one microphone, and
        at least one electronic nose,
    the at least one additional sensor being arranged in a region of the drive apparatus.

8. The maintenance system as recited in claim 1, wherein the at least one temperature sensor is mounted to a housing of the drive apparatus via a mechanical bracket.

9. The maintenance system as recited in claim 1, further comprising:
    a central maintenance data memory which comprises maintenance data for at least one of configuring, monitoring and modifying the controller.

10. The maintenance system as recited in claim 9, further comprising:
    a mobile maintenance device which is configured,
    to be coupled with the non-volatile memory of the controller via a bidirectional first data connection so as to maintain the gate device, and
    to be coupled directly or indirectly with the central maintenance data memory via a bidirectional second data connection.

11. The maintenance system as recited in claim 1, wherein the gate data includes at least one of,
    a serial number,
    a gate position,
    a gate type,
    a number of closing cycles,
    hardware information,
    a fault message, and
    an operating state,
    of the gate device, respectively.

12. The maintenance system as recited in claim 1, wherein the motor control unit and the non-volatile memory are provided separately.

* * * * *